(12) United States Patent
Keeling et al.

(10) Patent No.: US 8,535,538 B1
(45) Date of Patent: Sep. 17, 2013

(54) BRINE WATER RECYCLE PROCESS

(75) Inventors: John J. Keeling, Fairmount, WV (US); Rex B. Tennant, II, Bridgeport, WV (US); David B. Wingard, Petersburg, WV (US)

(73) Assignee: Fairmount Brine Processing, LLC, Pittsburgh, PA (US)

( * ) Notice: Subject to any disclaimer, the term of this patent is extended or adjusted under 35 U.S.C. 154(b) by 310 days.

(21) Appl. No.: 12/694,059

(22) Filed: Jan. 26, 2010

Related U.S. Application Data

(60) Provisional application No. 61/147,609, filed on Jan. 27, 2009.

(51) Int. Cl.
*C02F 1/28* (2006.01)
*C02F 1/38* (2006.01)
*C02F 1/52* (2006.01)

(52) U.S. Cl.
USPC ........... 210/664; 210/665; 210/669; 210/694; 210/702; 203/11; 203/41; 203/77; 166/266; 166/267; 423/499.4

(58) Field of Classification Search
USPC ........... 210/664, 665, 669, 694, 702; 203/11, 203/41, 77; 166/266, 267; 423/499.4
See application file for complete search history.

(56) References Cited

U.S. PATENT DOCUMENTS

| | | | |
|---|---|---|---|
| 3,797,552 A | 3/1974 | Frank et al. | |
| 3,868,308 A | 2/1975 | Barak et al. | |
| 3,951,752 A | 4/1976 | Roller | |
| 3,968,002 A | 7/1976 | Standiford | |
| 4,054,493 A | 10/1977 | Roller | |
| 4,141,410 A | 2/1979 | Takada | |
| 4,247,371 A | 1/1981 | Roller | |
| 4,427,495 A | 1/1984 | Masero | |
| 4,495,160 A | 1/1985 | Moote et al. | |
| 4,634,533 A | 1/1987 | Somerville et al. | |
| 4,882,009 A | 11/1989 | Santoleri et al. | |
| 5,346,592 A | 9/1994 | Madani | |
| 5,810,977 A | 9/1998 | Annecharico et al. | |
| 5,882,524 A | 3/1999 | Storey et al. | |
| 5,925,223 A | 7/1999 | Simpson et al. | |
| 6,365,005 B1 | 4/2002 | Schleiffarth | |
| 6,383,261 B2 * | 5/2002 | Myers et al. | 95/235 |
| 7,077,201 B2 | 7/2006 | Heins | |
| 7,150,320 B2 | 12/2006 | Heins | |
| 7,824,552 B2 * | 11/2010 | Slabaugh et al. | 210/709 |
| 8,158,097 B2 | 4/2012 | DiTommaso et al. | |
| 2008/0017326 A1 | 1/2008 | Hong | |
| 2008/0110630 A1 | 5/2008 | Minnich et al. | |
| 2008/0164136 A1 | 7/2008 | Ophir et al. | |
| 2008/0190607 A1 | 8/2008 | Minnich et al. | |
| 2008/0196894 A1 | 8/2008 | Minnich et al. | |

* cited by examiner

*Primary Examiner* — Matthew O Savage
(74) *Attorney, Agent, or Firm* — Buchanan Ingersoll & Rooney PC

(57) ABSTRACT

Embodiments provided herein include methods and apparatuses for purification and recycling of hydrofracture water used in natural gas drilling and production. Embodiments include removal of dissolved solids by precipitation with sodium sulfate and by evaporation using, for example, a multiple effect evaporator.

15 Claims, 2 Drawing Sheets

BRINE WATER RECYCLE PROCESS

CROSS-REFERENCE TO RELATED APPLICATIONS

This application claims priority to U.S. Provisional Patent Application No. 61/147,609, filed on Jan. 27, 2009. That document is incorporated by reference herein.

BACKGROUND OF THE INVENTION

1. Field of the Invention

Embodiments of the invention related to methods, systems, and apparatuses for brine water recycling.

2. Background of the Art

Natural gas well development and production require significant amounts of water. For use of this water to be environmentally responsible and procedurally effective, it should be relatively free of impurities. In some cases it may be desirable to use recycled water in well development and production. Recycled water may already have been used in natural gas well development and production, or it may come from another source. Water obtained from natural gas drilling and production may contain organic materials, oils, volatile compounds, semi-volatile compounds, metal compounds, and suspended/dissolved solids. It would be desirable to reduce the amounts of these materials in water to be re-used. It would also be desirable to reduce impurities in water that is to be disposed of.

BRIEF DESCRIPTION OF THE INVENTION

We have developed a design for a natural gas well development and production produced brine water recycle plant. Although embodiments herein are discussed in the context of natural gas drilling and production, it will be understood that embodiments proposed herein may be used in any situation where impurities to be removed exist.

DETAILED DESCRIPTION OF THE INVENTION

Figure 1:
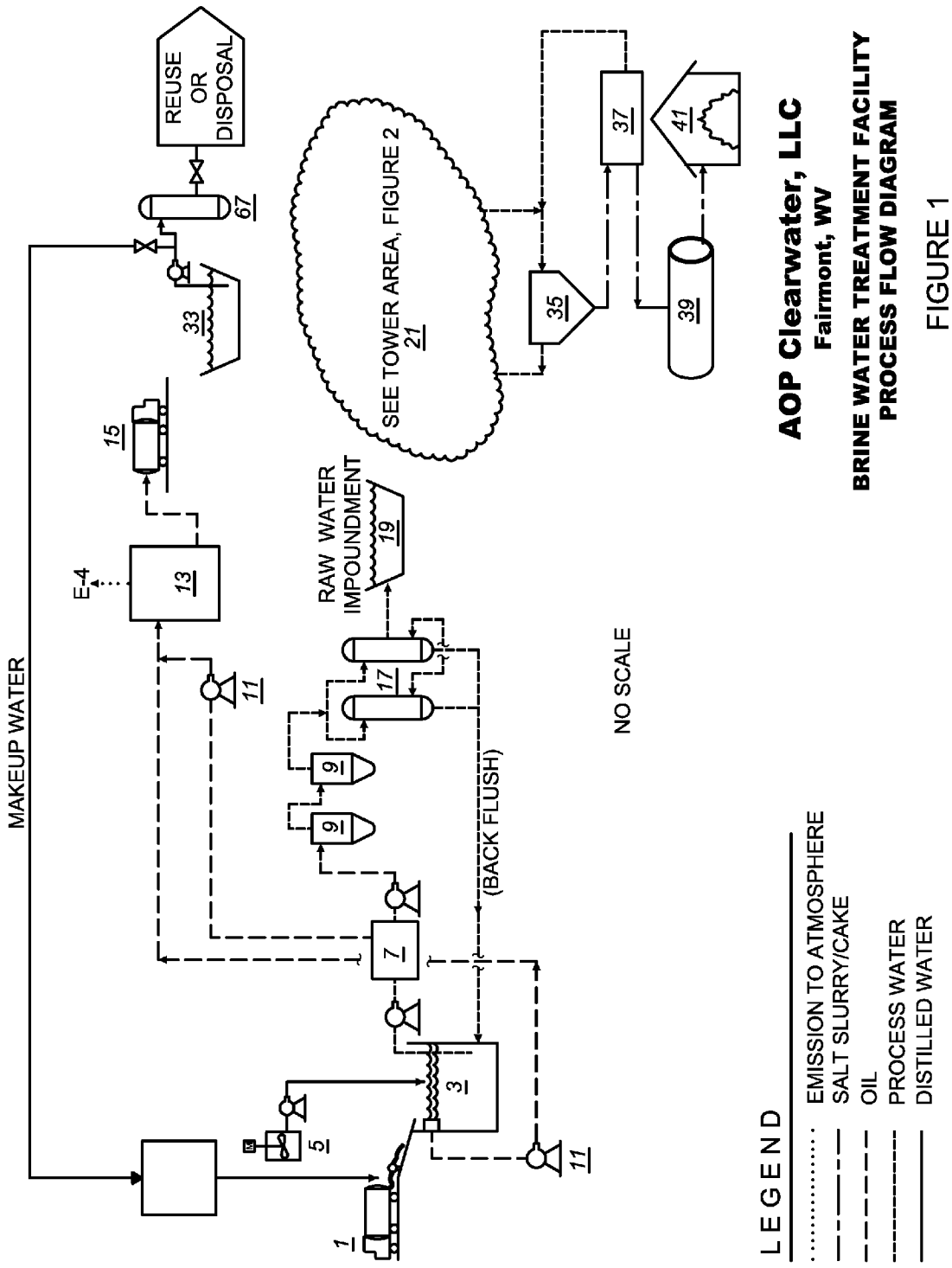
FIG. 1 shows a flow diagram of one embodiment of the invention.
Figure 2:
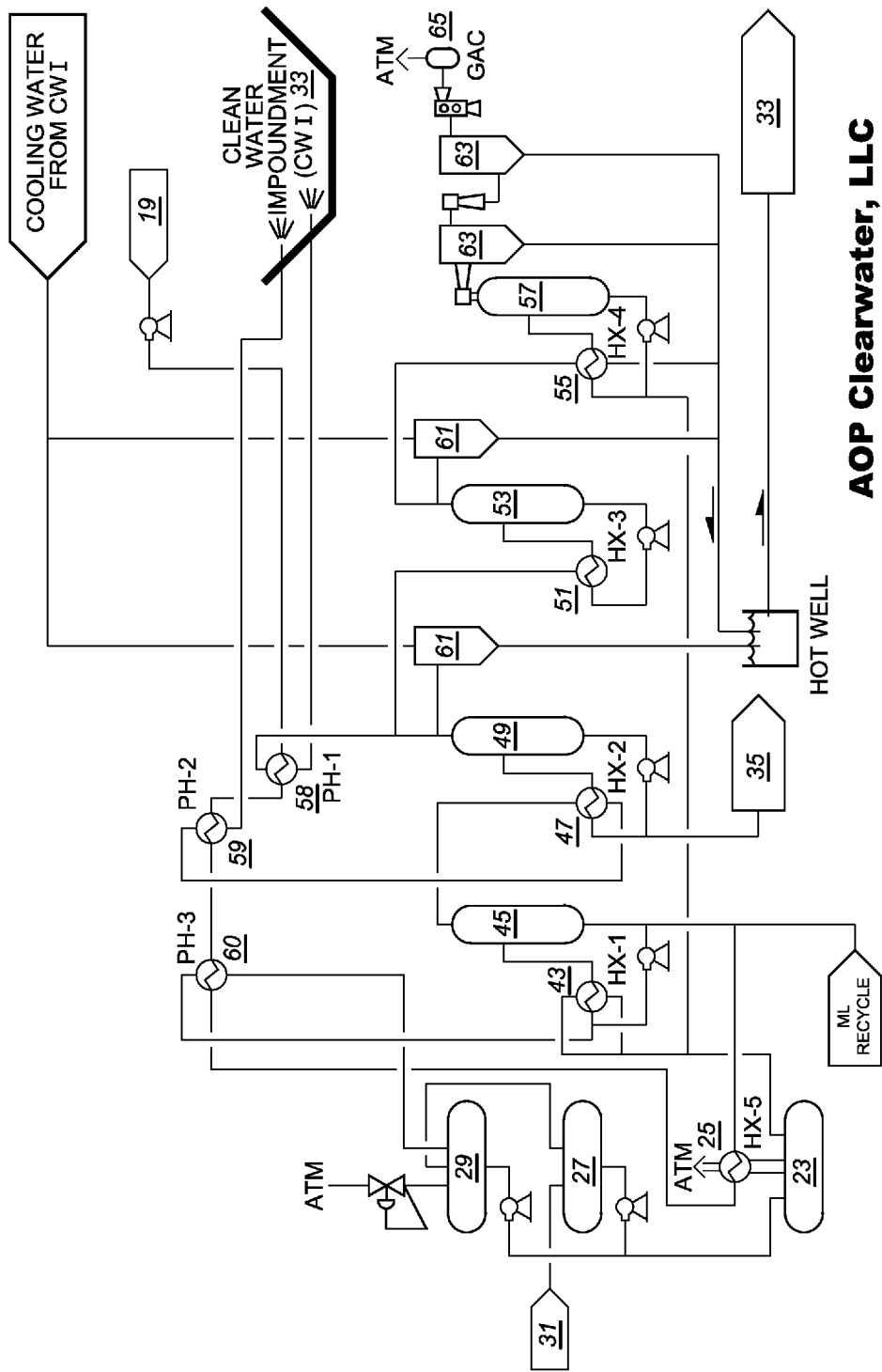
FIG. 2 shows a detail of the evaporation tower of the embodiment for which a complete process is depicted in FIG. 1.

Production of distilled water is desirable for use in natural gas well drilling and natural gas well development. The source water used may be from natural gas well development and production (including hydrofracture, or "frac," water), though as already noted embodiments described herein may use water from one or more of a variety of sources not limited to natural gas drilling and production, and the recycled water may be reused or disposed of as desired. According to one embodiment of the invention, source water, which contains limited organics, will be pre-treated at a facility to remove oils, volatile compounds, semi-volatile compounds, specific metal compounds (including, for example, but not limited to barium, strontium, and radium) and suspended/dissolved solids.

Oils may include, for example, but are not limited to Gasoline Range Organics (GRO), which are aliphatic organic compounds in the range of C6 to C10; Diesel Range Organics (DRO), which are aliphatic organic compounds in the range of C10 to C28; and Oil Range Organics (ORO), which are aliphatic organic compounds which have carbon chains greater than C28. Volatile organic compounds may include, for example, but are not limited to, aliphatic organic compounds in the range of C1 through C5, short-chain olefinic organic compounds, aromatic hydrocarbons such as benzene, toluene, ethylbenzene, and xylenes.

Semi-volatile organic compounds may include, for example, but are not limited to, polynuclear aromatic hydrocarbons (PAH), phenol and phenolic compounds, and phthalate esters. Suspended solids may include, but are not limited to, clay or silt particles, insoluble metallic salts, such as iron oxide, iron hydroxide, aluminum hydroxide, manganese dioxide, barium sulfate, and strontium sulfate. Dissolved solids may include, but are not limited to, sodium chloride, potassium chloride, calcium chloride, magnesium chloride, barium chloride, strontium chloride, and lithium chloride.

These compounds are often present in amounts between 0.5 to 200 mg/l for oils, 0.1 to 5.0 mg/l for volatile compounds, 0.1 to 5.0 mg/l for semi-volatile compounds, 1000-500,000 mg/l for metal compounds, and 10 to 750 mg/l for suspended solids. Following pre-treatment, the water will be processed to remove dissolved solids to a concentration of less than 500 mg/l. In a preferred embodiment the dissolved solids are removed to a concentration of less than 300 mg/l, and in a most preferred embodiment to a concentration of less than 100 mg/l.

The treated water may be sold to natural gas well drilling companies for development of natural gas wells. Water may also be sold to others for process use if surplus water is available. In the event the demand for the "distilled water" does not balance with raw water processing, some of the distilled water may be discharged, preferably to a sanitary sewer or acceptable environmental outlet.

Boiler water blow down, sanitary sewage, and equipment wash water may be discharged to a sanitary sewer system. Non-contaminated stormwater from building roofs, roadways, and truck pads at a facility practicing the process may be discharged to the environment from a stormwater detention pond.

Representative water samples of frac water (natural gas development water) and produced water have been collected from several shale formation natural gas well drilling locations. These "brine water" samples were split, with a portion analyzed and the remainder used for pilot studies using bench scale equipment to treat the samples in a manner similar to the full scale design. The distilled water and salt produced from the pilot studies have been analyzed to determine that water quality and salt quality of the produced materials.

The water produced from the pilot studies was found to have organic content ranging from a few (<10) to over 1000 parts per million and inorganic content ranging from <10 to over 250,000 parts per million. The salt was identified as 75 wt % halite (sodium chloride) with the remainder comprised of other miscellaneous salts, including strontium chloride, sodium sulfate, sodium chlorate, sodium bromide, calcium chloride, magnesium chloride. The metals analysis identified low concentrations of a variety of metals in the salt.

Process Overview

Turning now to the figures, as shown in FIG. 1 a facility receives water (raw water) containing oil, volatile/semi-volatile compounds, suspended solids, and dissolved inorganic salts. The water is delivered, for example, by tank trucks which may be unloaded on a concrete pad 1. In another embodiment, water is delivered by pipeline.

The raw water is transferred to an enclosure 3. Although a concrete-lined basin is shown in the figure, the enclosure may be partial or complete, and may be a pond, basin, tank, or other facility. Transfer may occur, for example, by pump, by gravity flow, or by a combination of the two. The enclosure may be used to allow for gravity phase separation of oil and suspended solids, as well as for metals treatment 5 with sodium sulfate to remove low concentrations of barium, radium and strontium from the brine water. Water exiting the basin will then flow through an oil/water separator 7 for further removal of immiscible organics to a concentration of less than 30 mg/l. A filter 9 is provided for removal of most of the remaining suspended solids to a concentration of less than 20 mg/l.

Solids from the enclosure will be dewatered. The solid material will be disposed at a landfill if beneficial use cannot be achieved. The oil from the surface of the enclosure and the oil/water separator may be sent by oil pump 11 and may be stored in an on-site tank (or other suitable on-site facility) 13 for sale and/or shipped off-site 15.

The pre-treated water, which contains high concentrations of dissolved solids, will be treated by carbon adsorption beds 17 to remove residual oil and volatile/semi-volatile compounds. Water exiting the carbon beds will be transferred to an impoundment 19, tank, or other suitable receiving area. The receiving area may be lined; for example, it may be lined with high-density polyethylene ("HDPE"). The water from the receiving area will be processed in a evaporation tower 21. Processing preferably occurs at a rate of approximately 9,000 gallons per hour, to remove the dissolved solids (for example, salt), though of course other rates may be engineered if desired.

The heat source for the solids removal process may be, for example, steam, which may be produced by a boiler 23 with a heat exchanger 25, de-aerator 27, and flash tank 29. Make-up water 31 may be added to the boiler as necessary. Preferably the boiler is a natural gas fueled boiler, though of course other fuels and boiler types may be used so long as heat is provided. The solids removal process (including a settling tank, evaporator, and condenser) will yield distilled water and salt. In some embodiments injection of superheated steam into the brine solution allows energy to be supplied without heat exchangers.

The distilled water may be stored in a "distilled water" (also called "clean water") impoundment 33. The impoundment may be lined, for example, with high density polyethylene (HDPE). The removed dissolved solids (primarily salts) may be sent to a settling tank 35, centrifuged 37, dried in a rotary dryer 39, and stockpiled inside a storage building 41. Trucks for load out and sale of the salts may be loaded under roofs to prevent precipitation contact with the material. The design may be scaled for almost any desired salt production (and therefore water purification) provided that the necessary land, energy, and equipment are available.

Pre-Treatment for Metals Removal

It is highly desirable to remove most of the metals, including barium, strontium and/or radium from the brine water prior to evaporation in order to insure that the produced salt has only minimal concentrations of barium (less than 100 mg/l TCLP sample digestion). Barium has been identified in frac water at typical concentrations of up to 600 mg/ml. Barium presence above 100 mg/l TCLP digestion for a solid is a criterion for classification of the solid as hazardous waste. Barium also may cause discoloration of surfaces if it is present in elevated concentrations. Barium and Strontium can also combine with certain anions to cause scaling in the equipment.

Sodium sulfate was selected as a preferred treatment of the brine water to remove the barium and strontium in the pre-treatment settling basin. However, other chemicals that may be used in the treatment include, for example, but are not limited to sodium sulfate, sulfuric acid, ammonium sulfate, sodium hydroxide, inorganic and/or organic flocculants, potassium sulfate, and combinations of them. For example, one alternative to treatment with sodium sulfate is acidification of the incoming brine water with sulfuric acid to produce a barium precipitate.

The barium reacts with the sodium sulfate to produce barium sulfate, which is insoluble and will result in barium concentrations of less than 100 mg/l TCLP extraction in the solid material removed during pre-treatment. In a preferred embodiment approximately three pounds of anhydrous sodium sulfate will be added to treat every 1,000 gallons of brine water. For example, approximately six hundred (600) pounds of sodium sulfate would be required to treat 5,000 barrels per day of brine water. The actual treatment will vary based on the received brine water quality, with the concentration of Barium in brine being the controlling variable:

$$Ba^{++} + Na_2SO_4 \rightarrow BaSO_4 + 2Na^+$$

Since one gram molecular weight (Mole) of is needed to treat each gram molecular weight of Sodium Sulfate:

$$\text{Pounds of Sodium Sulfate} = \frac{\text{mg/l Ba} * \text{Gallons of Brine} * 142.1 \text{ g/mole Na}_2\text{SO}_4 * 3.7854 \text{ liters/gallon}}{1000 \text{ mg/g} * 137.34 \text{ g/mole Barium} * 453.59 \text{ g/lb}}$$

Typically an "effective amount" of the precipitation-inducing compound will be added, where an "effective amount" of a compound is an amount sufficient to precipitate a desired amount of the compound to be removed.

Multi-Effect Evaporator

In a preferred embodiment the dissolved solids removal is effected by evaporation. Evaporation may be performed using a multi-effect evaporator. In one preferred embodiment the multi-effect evaporator is a three-effect evaporator. In another preferred embodiment the multi-effect evaporator is a four-effect evaporator. The first two effects, including Effect 1 (heat exchanger 43 and vapor/liquid separator 45) and Effect 2 (heat exchanger 47 and vapor/liquid separator 49) will be operated at a positive pressure (typically between 35 to 175 psia) and the last two effects, including Effect 3 (heat exchanger 51 and vapor/liquid separator 53) and Effect 4 (heat exchanger 55 and vapor/liquid separator 57) will operate at a negative pressure (typically between 2 to 0.2 psia). In a preferred embodiment the heat exchangers are horizontal, which is believed to allow for more efficient periodic maintenance.

The liquid inside the exchanger tubes is heated by condensing steam/process vapor on the tubes' outside surfaces. Back pressure is maintained on the circulating liquid until it enters the vapor/liquid separator, where a small percentage of the liquid stream (typically about 1-5%) will flash to vapor. Recirculation rates are preferably several times the feed rate (for example, between 20 and 30 times) to enable enough vapor production to heat the subsequent effects, to achieve production demand for distilled water, and to keep velocities in the heat exchanger tubes high enough to delay fouling of the interior surfaces.

Preferably, shell (carbon steel) and tube (70/30 cupronickel tubes) type heat exchangers with vapor/liquid separators of 316L stainless steel are used in the evaporator, though of course other types and sizes may be used. The operating life of the heat exchangers and vapor-liquid separators is expected to be about five years. Brine/slurry pumps will preferably be of duplex (e.g. CD4MCu) stainless steel. Other materials, including HASTELLOY® C brand alloy and INCONEL® brand alloy, may be used in the equipment as well. HASTELLOY® is a registered trademark of Haynes International, Inc.; INCONEL® is a registered trademark of Inco Alloys International, Inc.

In a four-effect evaporator the first two effects concentrate the solution via recirculation and partial flashing (typically 1%-5% per pass) from 10%-15% NaCl, typically 12%, in the feed to about 30% at the outlet of the second effect. The third effect preferably operates at between 2 to 0.2 psia and concentrates the brine from about 30% to about 45% NaCl. The fourth effect preferably operates at 0.2 psia and concentrates the brine from about 45% to about 55-60%, typically 57% NaCl.

Typically a small portion of the circulating solution will be pumped to a settler to allow gravity separation of solid crystals, which will be fed via a variable-speed, positive displacement pump to the centrifuge. A preferred embodiment uses level control in the vapor-liquid separators to replenish the slurry transferred to settler with an equal volume of feed and/or supernatant solution from the settler. Preferably the evaporators are a forced circulation design. Sufficient back pressure will be maintained on the re-circulating solution via a control valve to prevent boiling in the heat exchange tubes. This minimizes scaling, fouling and the downtime associated with scale removal.

The liquid is superheated as a result of the backpressure. The liquid passes through the control valve into the vapor/liquid separator, which is maintained at a lower pressure. Partial vaporization "flashing" (typically 1%-5%) will occur as the liquid exits the control valve. The heat added in the recirculation loop supplies energy to vaporize part of the liquid in the vapor/liquid separator.

The residual (unflashed) liquid is mixed with incoming feed and/or saturated solution from the settler, and the resulting mixture is re-circulated for additional heating and flashing. Typical anticipated vapor production rates in Effects 1 and 2 are approximately 28,000 lbs/hour from each Effect. Typical vapor production in Effect 3 is approximately 544 lb/hr. Typically the hot vapors from Effects 1-3 condense via three shell and tube feed preheaters 58, 59 and 60, three shell and tube brine recirculation heaters, and two direct-contact barometric condensers 61.

The product of vaporization is liquid distillate. Typically the distillate is cooled to between 150 and 250° F. as it preheats the incoming feed in a series of shell and tube heat exchangers.

Effect 4 is typically smaller than Effects 1-3, and the vapor production rate is typically low (preferably about 530 lbs/hour) to minimize the size of the after condenser and vacuum equipment. Saturated liquid existing Effect 4 is routed to settler 35. Vapor and non-condensable gases from Effect 4 are sent through two barometric condensers 63, filtered through an activated carbon bed 65 via a vacuum pump, and sent to the atmosphere. If desired, water from clean water impoundment 33 is filtered through an additional activated carbon bed 67 and either sold or disposed of.

Although embodiments of the invention are described herein in the context of multiple effect evaporators, other evaporation equipment may be used. Evaporation equipment that may be used in this process includes, for example, but is not limited to thermocompression of some of the process vapor using motive steam from the boiler; mechanical vapor recompression using a motor-driven compressor for re-use in the heat exchangers; and thin-film evaporation of the brine on the exterior tube surfaces. Those skilled in the art will understand, however, that additional and/or intermediate effects may be added.

Example Walk-Through of Process for Frac Water Recycling

A load of frac water (that is, water used in natural gas drilling and production) was transferred to a concrete lined basin where approximately 10 pounds of sodium sulfate was mixed with 3400 gallons of water. The sodium sulfate dosage amount was based on the barium content of the incoming frac water. Gravity settling of greater than 95% of the suspended solids was also accomplished in the basin, which had a minimum retention time of fifteen minutes. Any hydrocarbons from the incoming frac water were removed through a combination of one or more of gravity separation (for example, by an oil skimmer), an oil/water separator (including coalescing filter), and carbon absorption.

The pre-treated brine water was transferred to a closed piping system, which included indirect heating through heat exchangers to a temperature of approximately 385° F. for injection into the first evaporation effect. The first evaporation effect operated at a temperature of approximately 370° F. and a pressure of approximately 175 psia. Water vapor produced in the first effect was used to heat the brine recirculating in the second effect via indirect heat exchange (by shell and tube heat exchanger). A portion (about 2.5%) of the concentrated liquid from the first effect was pumped to the second effect, and the remainder (about 97.5%) continued to recirculate.

The second evaporation effect operated at a temperature of approximately 260° F. and a pressure of about 35 psia. A portion (about 31%) of the water vapor produced in the second effect was condensed via direct contact with cooling water in a barometric condenser. About 13% of the second effect vapor was used to heat the recirculating brine in the third effect via a shell and tube condenser) and about 55% of the second effect vapor was used to preheat the raw brine feed (via an additional shell and tube condenser), to produce clean condensate. A portion (about 1.5%) of the concentrated liquid from the second effect was pumped to the third effect and/or the settling vessel, while the remainder (about 98.5%) continued to recirculate.

The third evaporation effect operated at a temperature of approximately 126° F. and a pressure of approximately 2 psia. Water vapor was vented from the third effect to a barometric condenser (about 95% of third effect vapor) and the recirculating heater for the fourth effect (about 5% of third effect vapor). A portion (about 3%) of the concentrated liquid in the third effect was then pumped to the fourth effect and/or the settling vessel, while the remainder (about 97%) continued to recirculate.

The fourth evaporation effect operated at a temperature of approximately 53° F. and a pressure of approximately 0.2 psia. Water vapor (approximately 150 lb/hr) was vented and condensed in two barometric condensers (components of the vacuum system). The concentrated liquid inside the fourth effect was transferred as slurry to a settler. Solids from the settler were pumped to a centrifuge that separates the salt crystals which include sodium chloride from the supernatant liquid (saturated solution). Supernatant (saturated) liquid from the settler and the centrifuge was recycled to evaporation Effects 1 or 2 for further concentration. The salt crystals from the centrifuge were dried in a rotary drier to a moisture content of less than 2%. These salt crystals could then be disposed of, stored, or sold.

We claim:

1. A method for purifying brine water, comprising:
   providing brine water, said brine water comprising dissolved solids, suspended solids, volatile compounds, semi-volatile compounds, and oil;
   placing said brine water in an enclosure and partially removing oil and suspended solids by gravity phase separation;
   partially removing dissolved solids by precipitation in said enclosure;
   partially removing oil by treatment with an oil/water separator;
   filtering the brine water to partially remove suspended solids;
   treating the brine water with activated carbon to partially remove oil, volatile compounds, and semi-volatile compounds;
   transferring the brine water to a receiving area;
   transferring the brine water to an evaporator; and
   removing dissolved solids from said brine water by evaporation to produce purified water, concentrated brine, and additional removed solids.

2. The method of claim 1, wherein said dissolved solids comprise barium, strontium, and radium.

3. The method of claim 2, wherein said precipitation is accomplished by addition of an effective amount of a compound selected from the group consisting of sodium sulfate, sulfuric acid, ammonium sulfate and potassium sulfate.

4. The method of claim 3, wherein said compound is sodium sulfate.

5. The method of claim 1, wherein said enclosure is selected from the group consisting of a concrete-lined pond and a tank, and said receiving area is a high density polyethylene lined impoundment.

6. The method of claim 1, wherein said brine water is hydrofracture water from one of natural gas drilling and natural gas production.

7. The method of claim 1, wherein said evaporator is selected from the group consisting of a multiple effect evaporator, a thin-film evaporator, a mechanical vapor recompressor, and a thermocompressor.

8. The method of claim 1, wherein said evaporator is a multiple effect evaporator.

9. The method of claim 8, wherein said evaporator is a multiple effect evaporator comprising at least three effects.

10. The method of claim 9, wherein the first and second effects operate at positive pressure and the third effect operate at negative pressure.

11. The method of claim 9, wherein each of said effects comprises a horizontal heat exchanger.

12. The method of claim 8, wherein said evaporator is a forced-circulation multiple effect evaporator.

13. The method of claim 1, further comprising the steps of: treating the additional removed solids in a centrifuge; and drying the additional removed solids.

14. A method for producing sodium chloride, comprising: purifying brine water according to claim 1; transferring the additional removed solids to a settling tank; and drying said dissolved solids.

15. A method for recycling hydrofracture water used in natural gas drilling and production, comprising: purifying brine water according to the method of claim 6; and performing natural gas drilling and production using the purified water.

* * * * *